United States Patent
Pang et al.

(10) Patent No.: US 9,851,865 B2
(45) Date of Patent: Dec. 26, 2017

(54) METHOD FOR MANAGING APPLICATION AND ELECTRONIC DEVICE THEREOF

(71) Applicant: Samsung Electronics Co., Ltd., Suwon-si, Gyeonggi-do (KR)

(72) Inventors: Jeong-Hyun Pang, Seongnam-si (KR); Jin-Hong Jeong, Yongin-si (KR); Jin-Gil Yang, Suwon-si (KR); Pil-Joo Yoon, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 386 days.

(21) Appl. No.: 14/177,832

(22) Filed: Feb. 11, 2014

(65) Prior Publication Data

US 2014/0237402 A1 Aug. 21, 2014

(30) Foreign Application Priority Data

Feb. 21, 2013 (KR) .................. 10-2013-0018778

(51) Int. Cl.
*G06F 3/048* (2013.01)
*G06F 3/0481* (2013.01)
*G06F 3/0482* (2013.01)
*G06F 9/445* (2006.01)
*G06F 9/44* (2006.01)

(52) U.S. Cl.
CPC ........ *G06F 3/04817* (2013.01); *G06F 3/0482* (2013.01); *G06F 8/62* (2013.01); *G06F 9/4443* (2013.01)

(58) Field of Classification Search
CPC . G06F 21/88; G06F 21/57; G06F 8/62; G06F 8/61; G06F 9/445; G06F 3/0482; G06F 3/1225; G06F 3/1285; G06F 8/65; G06F 9/44505; G06F 21/305; G06F 21/70; G06F 21/71; G06F 2221/2101
See application file for complete search history.

(56) References Cited

U.S. PATENT DOCUMENTS

| | | | | |
|---|---|---|---|---|
| 8,600,803 B1* | 12/2013 | Noth | ................ | G06F 21/53 705/14.1 |
| 2013/0002706 A1* | 1/2013 | Rezende | ............ | G06F 3/04845 345/619 |
| 2013/0225148 A1* | 8/2013 | Ryu | ...................... | H04W 4/001 455/418 |

FOREIGN PATENT DOCUMENTS

KR   10-2010-0121974 A   11/2010

OTHER PUBLICATIONS

Paul Sanna, Special Edition Using Windows NT Workstation 4.0 (1997).*

* cited by examiner

*Primary Examiner* — Di Xiao
(74) *Attorney, Agent, or Firm* — Jefferson IP Law, LLP

(57) ABSTRACT

A method and an apparatus for managing an application are provided. A method of managing an electronic device includes deleting an application, detecting entering of an icon edit mode, and displaying an icon of the deleted application when in the icon edit mode.

18 Claims, 17 Drawing Sheets

METHOD FOR MANAGING APPLICATION AND ELECTRONIC DEVICE THEREOF

CROSS-REFERENCE TO RELATED APPLICATION(S)

This application claims the benefit under 35 U.S.C. §119(a) of a Korean patent application filed on Feb. 21, 2013 in the Korean Intellectual Property Office and assigned Serial No. 10-2013-0018778, the entire disclosure of which is hereby incorporated by reference.

TECHNICAL FIELD

The present disclosure relates to an electronic device. More particularly, the present disclosure relates to a method and apparatus for managing an application in an electronic device.

BACKGROUND

With the rapid increase in the use of electronic devices, electronic device vendors are competitively developing an electronic device for providing convenient and various additional functions to ensure more users. In particular, various applications which provide various functions for convenience and leisure of users are recently provided in a competitive manner. Therefore, several to dozens of applications are installed in the electronic device.

In particular, with the exponential increase in the number of applications in recent years, a user of the electronic device frequently performs a process for downloading and installing a desired application and for deleting an unnecessary application. In other words, the user of the electronic device may install or delete a new application, and may reinstall the deleted application. For example, the user of the electronic device may download a game application, which has never been installed before, from a server and install it to the electronic device, and may delete the installed game application and thereafter reinstall it by downloading the deleted game application.

As such, since the user of the electronic device repeats the process for installing and deleting the application several times, a situation occurs in which the application is unintentionally deleted or is deleted due to shortage of memory capacity. When the application installed in the electronic device is deleted, in order to determine which application is deleted, the user confirms download information by accessing a link through which the application is downloaded, and also in order to reinstall the application, the user searches for the application again by accessing to the download link, thereby causing inconvenience to the user.

Accordingly, there is a need for a method capable of easily confirming a deleted application in an electronic device and for easily reinstalling the deleted application.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for managing an application in an electronic device.

Another aspect of the present disclosure is to provide a method and apparatus for displaying an icon of a deleted application when entering an icon edit mode in an electronic device.

Another aspect of the present disclosure is to provide a method and apparatus for displaying an additional page for managing an icon of a deleted application in an electronic device.

Another aspect of the present disclosure is to provide a method and apparatus for storing application information when an application is deleted in an electronic device.

Another aspect of the present disclosure is to provide a method and apparatus for displaying an application download page when an application recovery menu is selected in an electronic device.

Another aspect of the present disclosure is to provide a method and apparatus for deleting application information when an application deletion menu is selected in an electronic device.

Another aspect of the present disclosure is to provide a method and apparatus for displaying application information when an application information menu is selected in an electronic device.

In accordance with an aspect of the present disclosure, a method of controlling an electronic device is provided. The method includes deleting an application, detecting entering of an icon edit mode, and displaying an icon of the deleted application when in the icon edit mode.

In accordance with another aspect of the present disclosure, an electronic device is provided. The electronic device includes one or more processors, a touch sensitive display, a memory, and one or more programs stored in the memory and configured to be executed by the one or more processors, wherein the program includes an instruction for deleting an application, for detecting entering of an icon edit mode, and for displaying an icon of the deleted application when in the icon edit mode.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

An electronic device described hereinafter is a touch input enabled mobile communication terminal, a smart phone, a tablet Personal Computer (PC), a digital camera, a Motion Picture Experts Group Layer 3 (MP3), a navigator, a laptop, a net-book, a computer, a television set, a refrigerator, an air conditioner, etc.

Figure 1A:
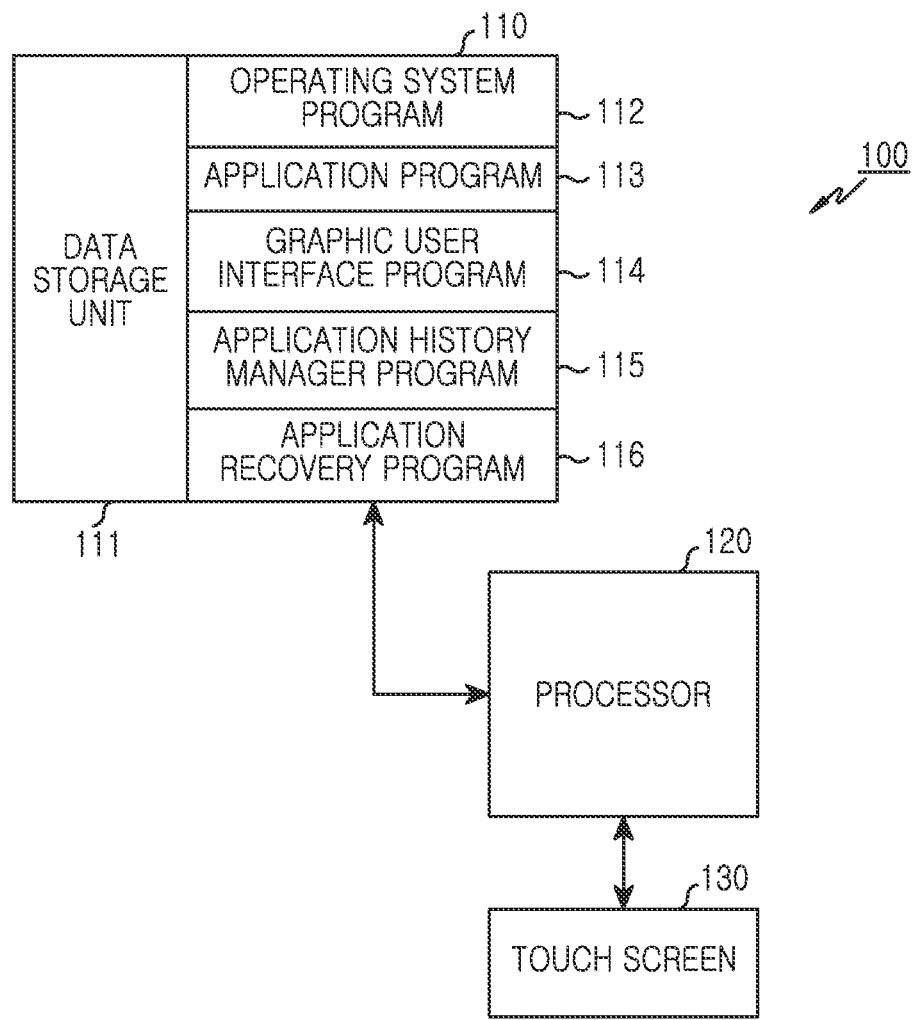
FIG. 1A is a block diagram of an electronic device for managing an application according to an embodiment of the present disclosure.

FIG. 1A is a block diagram of an electronic device for managing an application according to an embodiment of the present disclosure.

Referring to FIG. 1A, an electronic device 100 includes a memory 110, a processor 120, and a touch screen 130. The memory 110 and the processor 120 may be plural in number.

The memory 110 includes a data storage unit 111, an operating system program 112, an application (or app) program 113, a graphic user interface program 114, an app history manager program 115, an app recovery program 116, etc. In addition, since a program which is a software component can be expressed in a group of instructions, the program is also expressed in an instruction set. The program is also expressed in a module.

The memory 110 may store one or more programs including instructions for executing the embodiment of the present disclosure.

The data storage unit 111 stores data generated while performing a function corresponding to the program stored in the memory 110. The data storage unit 111 of the present disclosure may store application information for each deleted application. In this case, the application information includes the deleted application's name information, icon image information, download link information, download link information, capacity information, deletion location information, etc.

The operating system program 112 (e.g., a built-in operating system such as WINDOWS, LINUX, Darwin, RTXC, UNIX, OS X, or VxWorks) includes various software components for controlling a general system operation. For example, the control of the general system operation includes memory management and control, storage hardware (device) control and management, power control and management, etc. The operating system program 112 performs a function for facilitating communication between various hardware components (devices) and software components (programs).

The application program 113 includes a browser application, an email application, a message application, word processing application, an address book application, a widget application, a Digital Right Management (DRM) application, voice recognition application, voice recording application, a position determining function application, a location based service application, a telephone application, schedule management application, business management application, etc.

The graphic user interface program 114 includes at least one software component for providing a graphic-based user interface between the user and the electronic device 100. That is, the graphic user interface program 114 includes at least one software component for displaying user interface information in a front surface of the touch screen 130. According to the present disclosure, the graphic user interface program 114 includes an instruction for displaying an icon of a deleted application when entering an icon edit mode. For example, the graphic user interface program 114 may display the icon of the deleted application in a grayscale. For another example, the graphic user interface program 114 may display the icon of the deleted application in a color different from that of an icon of an undeleted application. For another example, the graphic user interface program 114 may display the icon of the deleted application in an animated manner. For another example, the graphic user interface program 114 may display the icon of the deleted application in a flickering manner. For another example, the graphic user interface program 114 may display the icon of the deleted application by adding a graphic effect. For another example, the graphic user interface program 114 may display the icon of the deleted application by changing an icon size.

In addition, upon selecting a menu for confirming application information of a specific application in the icon edit mode, the graphic user interface program 114 includes an instruction for displaying the application information of the application. For example, the graphic user interface program 114 may select a first application and thereafter, upon selecting the menu for confirming the application information, may display information on the first application in a table form.

The application history manager program 115 may store and manage information on an application. More specifically, the application history manager program 115 may store information on each application and display the stored application information under a user control. For example, when the application is installed, the application history manager program 115 may store information on the application. For another example, when the application is deleted, the application history manager program 115 may store information on the application.

In addition, when entering the icon edit mode, the application history manager program 115 may display an icon image of a deleted application. For example, when entering the icon edit mode, the application history manager program 115 may display an icon image of a deleted first application and an icon image of a second application. In this case, the application history manager program 115 may display the deleted applications in an additional page other than a page in which pre-installed applications are displayed. For example, when a page for displaying an icon of the pre-installed applications consists of 3 pages, the application history manager program 115 may additionally generate at least one page and additionally display an icon of a deleted application in the additionally generated page.

When entering the icon edit mode, the application control program 116 may control a deleted icon. More specifically, when in the icon edit mode, the application control program 116 may recover a deleted application or may completely delete the application, and may confirm information on the deleted application. In this case, the application control program 116 may recover the deleted application by reinstalling the deleted application, and may completely delete information related to the deleted application from the electronic device by deleting the information on the deleted application.

In the icon edit mode, the application control program 116 may display a page for recovering the application when a recovery menu is selected. More specifically, when the recovery menu is selected after a specific icon is selected in the icon edit mode, the application control program 116 confirms application information of an application corresponding to the selected icon. Thereafter, the application control program 116 may confirm download link information from the confirmed application information, and may access the confirmed download link and display a corresponding page.

When a deletion menu is selected in the icon edit mode, the application control program 116 may delete the application information on the application. More specifically, when the deletion menu is selected after a specific icon is selected in the icon edit mode, the application control program 116 deletes application information of an application corresponding to the selected icon.

When an information confirmation menu is selected in the icon edit mode, the application control program 116 may display application information on the selected application. More specifically, when the information confirmation menu is selected after a specific icon is selected in the icon edit mode, the application control program 116 displays application information of an application corresponding to the selected icon.

Although not shown, the processor 120 may include at least one processor and a peripheral interface. In addition, the processor 120 executes a specific program (instruction set) stored in the memory 110 to perform a plurality of specific functions corresponding to the program.

The touch screen 130 is a touch-sensitive display and provides an interface for a touch input/output between the electronic device 100 and the user. The touch screen 130 is a medium for sensing a touch (or contact) by using a touch sensor (not shown), for delivering the sensed touch input to the electronic device 100, and for visually providing an output from the electronic device 100 to the user. That is, the touch screen 130 provides the user with a visual output on the basis of a text, a graphic, and a video in response to the touch input.

The touch screen 130 includes a touch sensing surface for sensing a user's touch input, and senses an input of the user touch by using a haptic contact, a tactile contact, or a combination thereof. For example, a touch sensing point of the touch screen 130 corresponds to a digit of a finger used for the contact on the touch sensing surface. In addition, the touch screen 130 senses a contact made by an external device such as a stylus pen, etc., through the touch sensing surface. The detected contact is converted to an interaction corresponding to a user interface target (e.g., a soft key) displayed on the touch screen.

The touch screen 130 provides an interface for a touch input/output between the electronic device 100 and the user. More specifically, the touch screen 130 is a medium which delivers a user's touch input to the electronic device 100 and which visually provides the output from the electronic device 100 to the user. The touch screen 130 may use various display techniques such as a Liquid Crystal Display (LCD), a Light Emitting Diode (LED), a Light emitting Polymer Display (LPD), an Organic Light Emitting Diode (OLED), an Active Matrix Organic Emitting Diode (AMOLED), or a Flexible LED (FLED). The touch screen 130 of the present disclosure is not limited to the touch screen which uses such display techniques. In addition, the touch screen 130 may sense a start of a contact on the touch sensing surface, a movement of the contact, or a holding or ending of the contact by using various techniques of touch detection (or sensing) such as capacitive detection, resistive detection, infrared detection, or surface acoustic wave detection. The touch screen 130 of the present disclosure may receive an input for entering the icon edit mode, and upon receiving the input, may display an icon edit mode screen. For example, the touch screen 130 may display the icon edit mode screen if a touch is input to a wallpaper for a time greater than or equal to a threshold time. In addition, the touch screen 130 may display an icon of the deleted application in the icon edit mode.

Figure 1B:
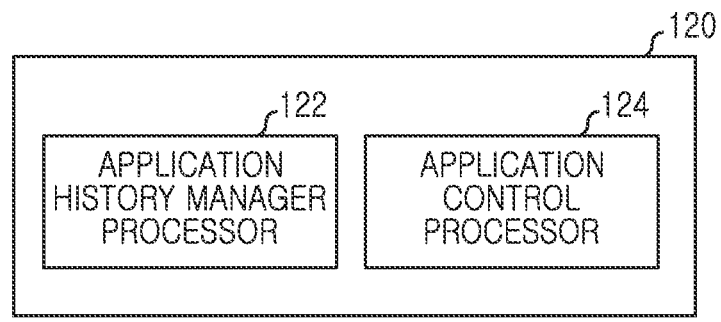
FIG. 1B is a block diagram of a processor for managing an application according to an embodiment of the present disclosure.

FIG. 1B is a block diagram of a processor for managing an application according to an embodiment of the present disclosure.

Referring to FIG. 1B, the processor 120 includes an application history manager processor 122 and an application control processor 124.

The application history manager processor 122 may store and manage information on an application. More specifically, the application history manager processor 122 may store information on each application and display the stored application information under a user control. For example, when the application is installed, the application history manager processor 122 may store information on the application. For another example, when the application is deleted, the application history manager processor 122 may store information on the application.

In addition, when entering the icon edit mode, the application history manager processor 122 may display an icon image of a deleted application. For example, when entering the icon edit mode, the application history manager processor 122 may display an icon image of a deleted first application and an icon image of a second application. In this case, the application history manager processor 122 may display the deleted applications in an additional page other than a page in which pre-installed applications are displayed. For example, when a page for displaying an icon of the pre-installed applications consists of 3 pages, the application history manager processor 122 may additionally generate at least one page and additionally display an icon of a deleted application in the additionally generated page.

When entering the icon edit mode, the application control processor 124 may control a deleted icon. More specifically, when in the icon edit mode, the application control processor 124 may recover a deleted application or may completely delete the application, and may confirm information on the deleted application. In this case, the application control processor 124 may recover the deleted application by reinstalling the deleted application, and may completely delete information related to the deleted application from the electronic device by deleting the information on the deleted application.

In the icon edit mode, the application control processor 124 may display a page for recovering the application when a recovery menu is selected. More specifically, when the recovery menu is selected after a specific icon is selected in the icon edit mode, the application control processor 124 confirms application information of an application corresponding to the selected icon. Thereafter, the application control processor 124 may confirm download link information from the confirmed application information, and may access the confirmed download link and display a corresponding page.

When a deletion menu is selected in the icon edit mode, the application control processor 124 may delete the application information on the application. More specifically, when the deletion menu is selected after a specific icon is selected in the icon edit mode, the application control processor 124 deletes application information of an application corresponding to the selected icon.

When an information confirmation menu is selected in the icon edit mode, the application control processor 124 may display application information on the selected application. More specifically, when the information confirmation menu is selected after a specific icon is selected in the icon edit mode, the application control processor 124 displays application information of an application corresponding to the selected icon.

Figure 2:
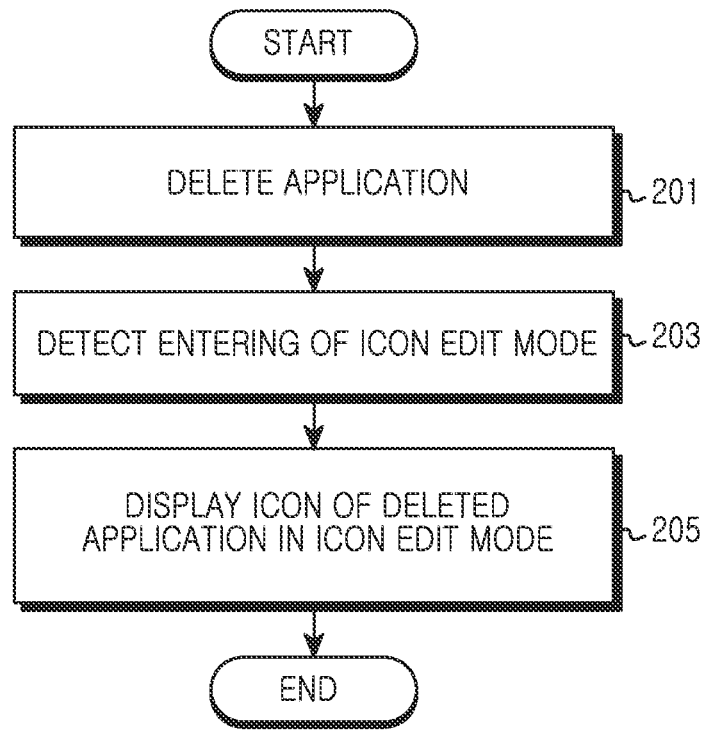
FIG. 2 is a flowchart of a process for displaying an icon of a deleted application in an electronic device according to an embodiment of the present disclosure.

FIG. 2 is a flowchart of a process for displaying an icon of a deleted application in an electronic device according to an embodiment of the present disclosure.

Referring to FIG. 2, the electronic device 100 deletes an application at operation 201, and then detects entering of an icon edit mode at operation 203. For example, the electronic device 100 deletes a first application installed in the electronic device 100. Thereafter, the electronic device 100 senses a touch on a wallpaper for a time greater than or equal to a threshold time. For another example, the electronic device 100 deletes the first application installed in the electronic device 100. Thereafter, the electronic device 100 detects that a menu for entering the icon edit mode is selected, and then enters the icon edit mode.

At operation 205, when in the icon edit mode, the electronic device 100 may display an icon of the deleted application. In this case, the electronic device 100 may add a graphic effect to the deleted application to distinguish the deleted application from an installed application. For example, the electronic device 100 may display the icon of the deleted application in a grayscale. For another example, the electronic device 100 may display the icon of the deleted application in an animated manner. For another example, the electronic device 100 may display the icon of the deleted application in a flickering manner. For another example, the electronic device 100 may display the icon of the deleted application by adding a graphic effect. For another example, the electronic device 100 may display the icon of the deleted application by adding a graphic effect. For another example, the electronic device 100 may display the icon of the deleted application by changing an icon size.

Figure 3:
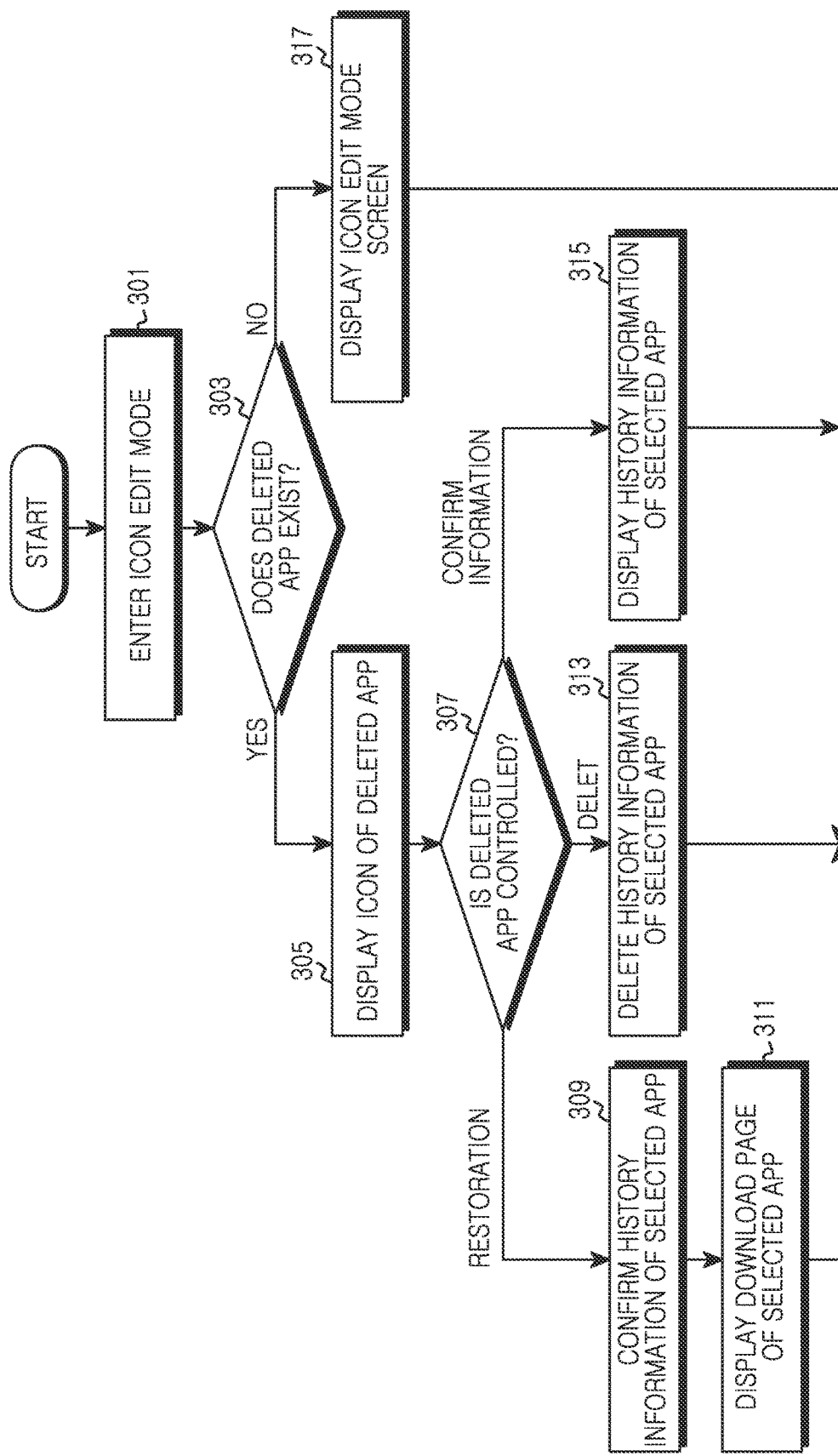
FIG. 3 is a flowchart of a process for managing a deleted application in an electronic device according to an embodiment of the present disclosure.

FIG. 3 is a flowchart of a process for managing a deleted application in an electronic device according to an embodiment of the present disclosure.

Referring to FIG. 3, the electronic device 100 enters an icon edit mode at operation 301. For example, the electronic device 100 senses a touch on a wallpaper for a time greater than or equal to a threshold time, and enters the icon edit mode. For another example, the electronic device 100 detects that a menu for entering the icon edit mode is selected, and then enters the icon edit mode.

At operation 303, the electronic device 100 determines whether there is a deleted application.

Figure 4:
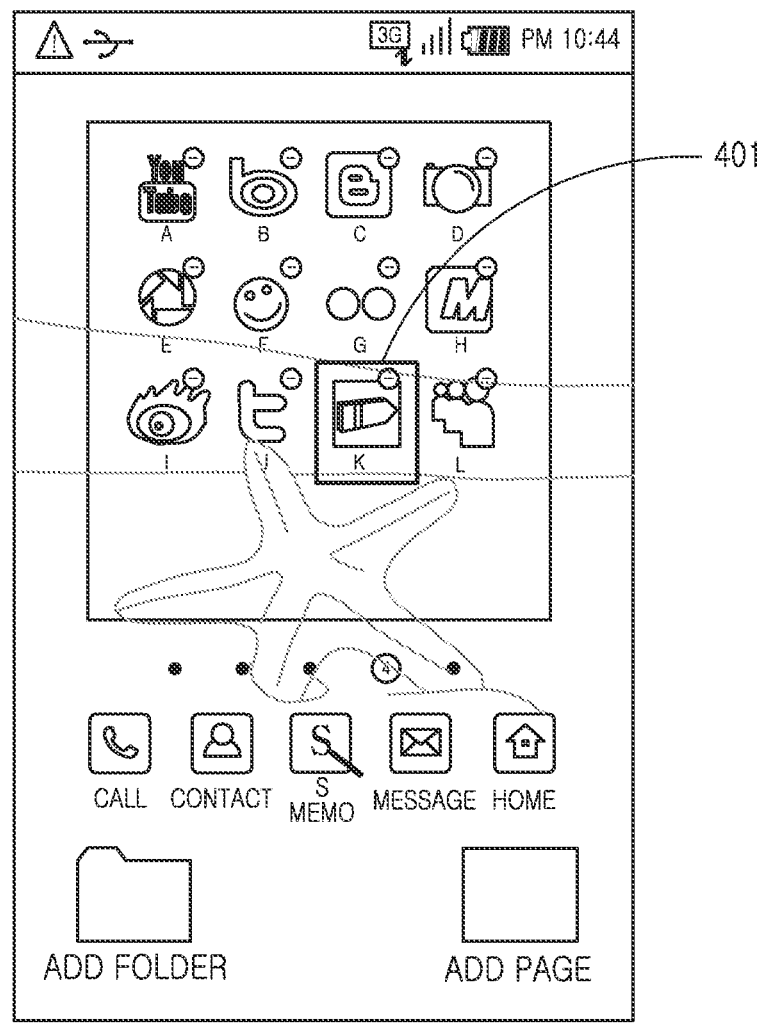
FIG. 4 illustrates an example of storing application information when an application is deleted in an electronic device according to an embodiment of the present disclosure.

If the deleted application does not exist, proceeding to operation 317, the electronic device 100 may display an icon edit mode screen. Thereafter, the procedure of FIG. 3 ends. On the other hand, if the deleted application exists, proceeding to operation 305, the electronic device 100 may display an icon of the deleted application. If the deleted application is present in the electronic device 100, the electronic device 100 confirms application information of the deleted application. In this case, the application information includes the deleted application's name information, icon image information, download link information, download link information, capacity information, and deletion location information. Further, the application information may be acquired or stored when the application is installed or when the application is deleted. For example, as illustrated in FIG. 4, when a first application 401 is deleted, the electronic device 100 may store information of the first application. In this case, the information of the first application includes first application's name information, icon image information, download link information, download link information, capacity information, and deletion location information, and may be stored in a table form. In addition, the first application information may be used when the first application is controlled. For example, the first application's name information and icon image information may be used to display the first application when displaying the deleted application. For another example, the first application's download link information may be used to download the first application when recovering the first application. For another example, the first application's capacity information may be used to confirm whether there is sufficient memory capacity for reinstalling the first application when recovering the first application. For another example, the first application's deletion location information may be used to reinstall the first application at a location at which the application is deleted, when recovering the first application.

Figure 5A:
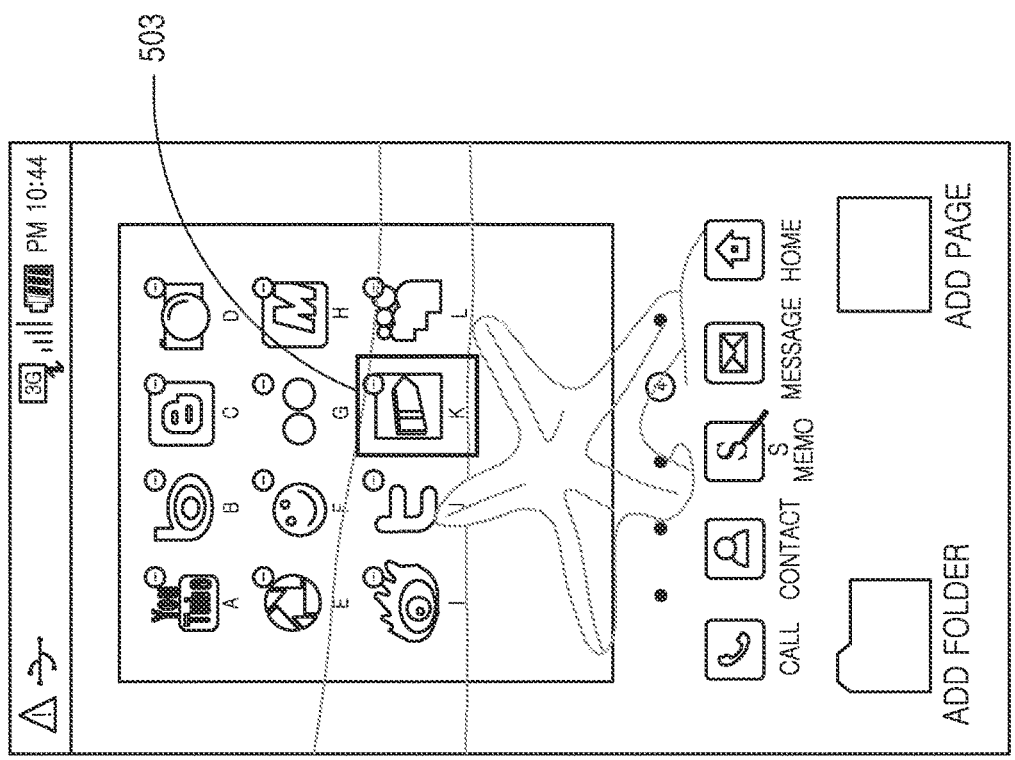
FIGS. 5A and 5B illustrate examples of displaying an icon of a deleted application in an electronic device according to an embodiment of the present disclosure.
Figure 5A:
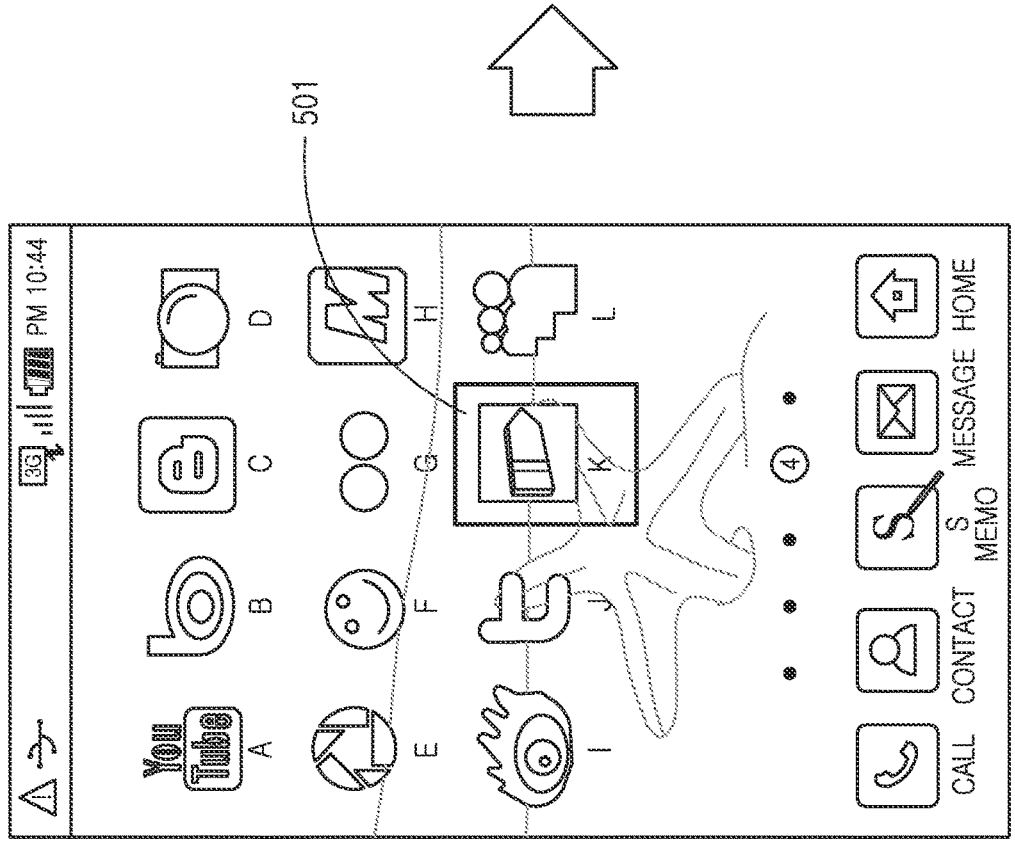
Figure 5B:
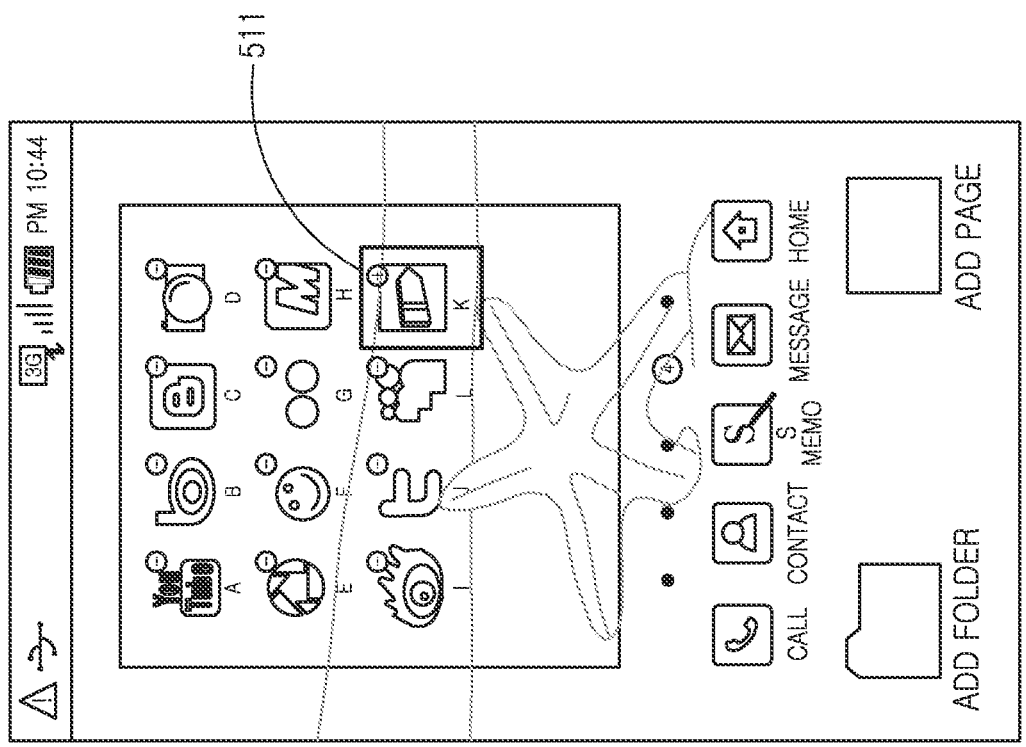
Figure 5B:
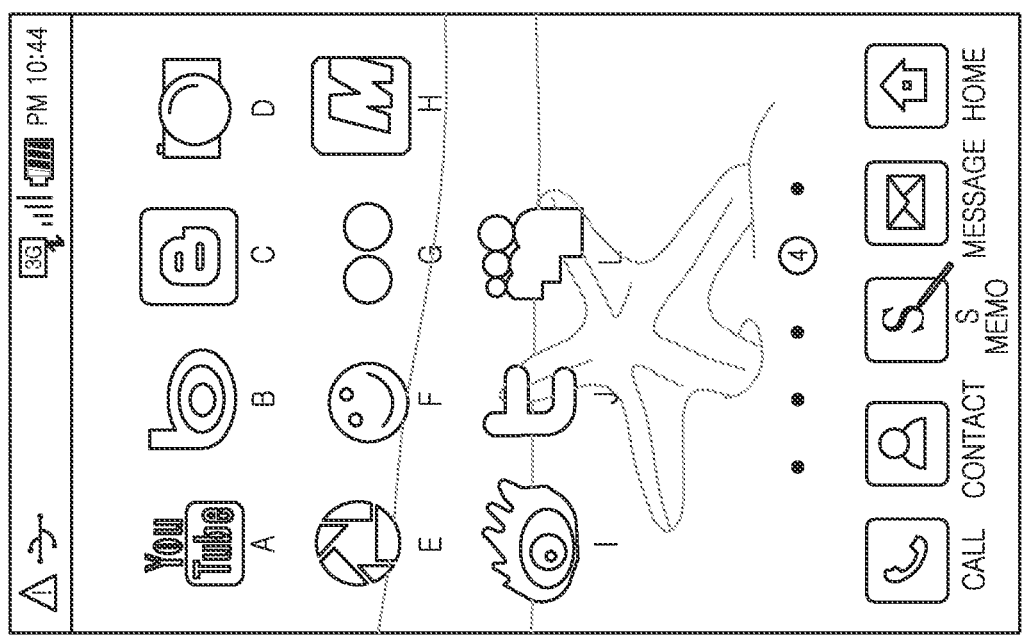
Figure 6A:
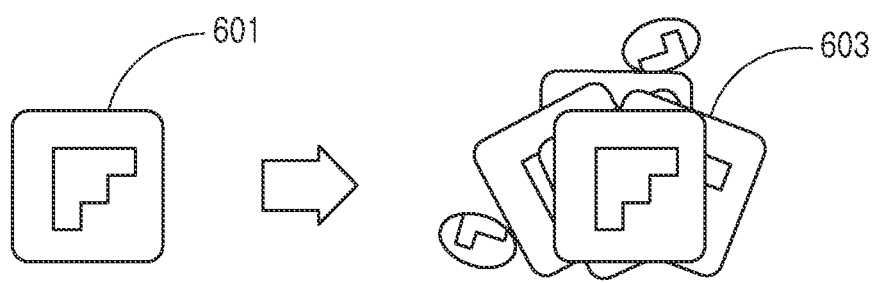
FIGS. 6A, 6B, and 6C illustrate examples of showing a graphic effect of a deleted application in an electronic device according to an embodiment of the present disclosure.
Figure 6B:
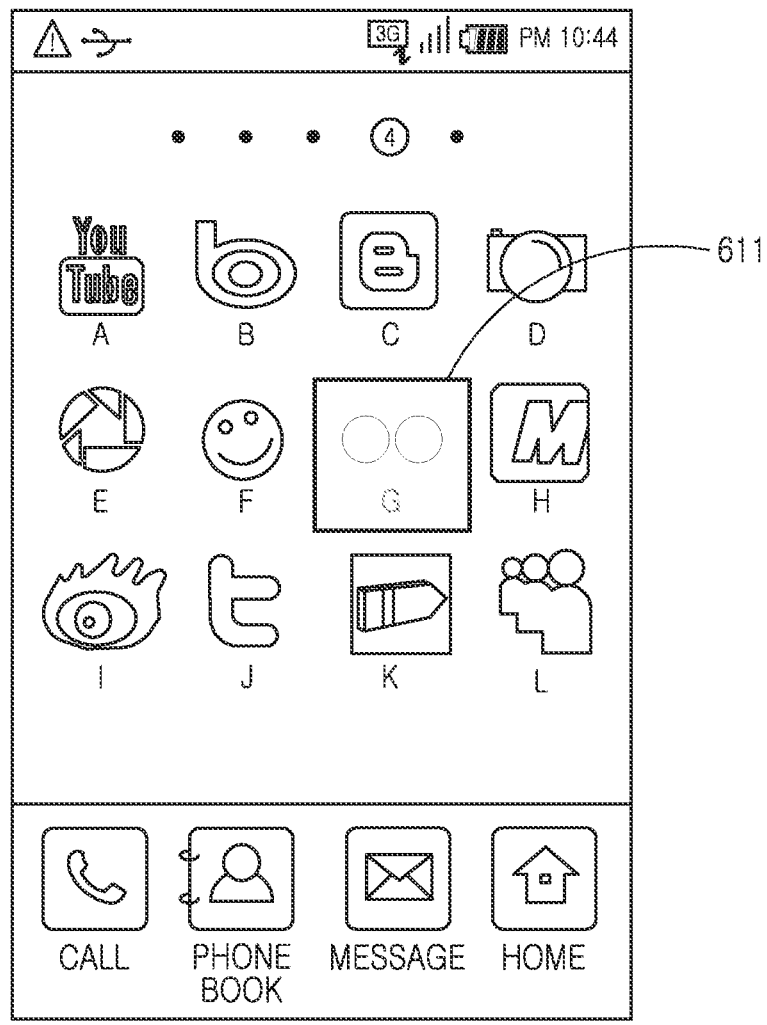
Figure 6C:

In addition, the electronic device 100 may display an icon of a deleted application at a next location of an icon arranged at a last location of previously arranged icons or may display the icon of the deleted application at a page different from that of the previous icons. For example, as illustrated in FIG. 5A, the electronic device 100 may enter the icon edit mode to delete a first application 501, and may delete an icon of the first application 501 (see 503). Thereafter, as illustrated in FIG. 5B, instead of displaying the icon of the first application in a wallpaper (or a home screen), when entering the icon edit mode, the electronic device 100 may display an icon 511 of the deleted first application. In this case, the electronic device 100 may confirm a location at which the icon of the first application is deleted, that is, a location at which the icon is arranged in a screen before being deleted, and then may display the icon of the first application at the confirmed location. In addition, the electronic device 100 may display the deleted icon by adding various graphic effects. For example, as illustrated in FIG. 6A, the electronic device 100 may delete an icon 601 installed in the electronic device 100, and thereafter if the icon is displayed in the icon edit mode, may display an icon 603 of the deleted application by adding an animation graphic effect. For another example, as illustrated in FIG. 6B, the electronic device 100 may delete an icon installed in the electronic device 100 and thereafter if the icon is displayed in the icon edit mode, may display an icon 611 of the deleted application in a grayscale. For another example, as illustrated in FIG. 6C, the electronic device 100 may delete the icon installed in the electronic device 100, and thereafter if the icon is displayed in the icon edit mode, may display the icon 611 of the deleted application by adding an additional graphic effect.

Figure 7A:
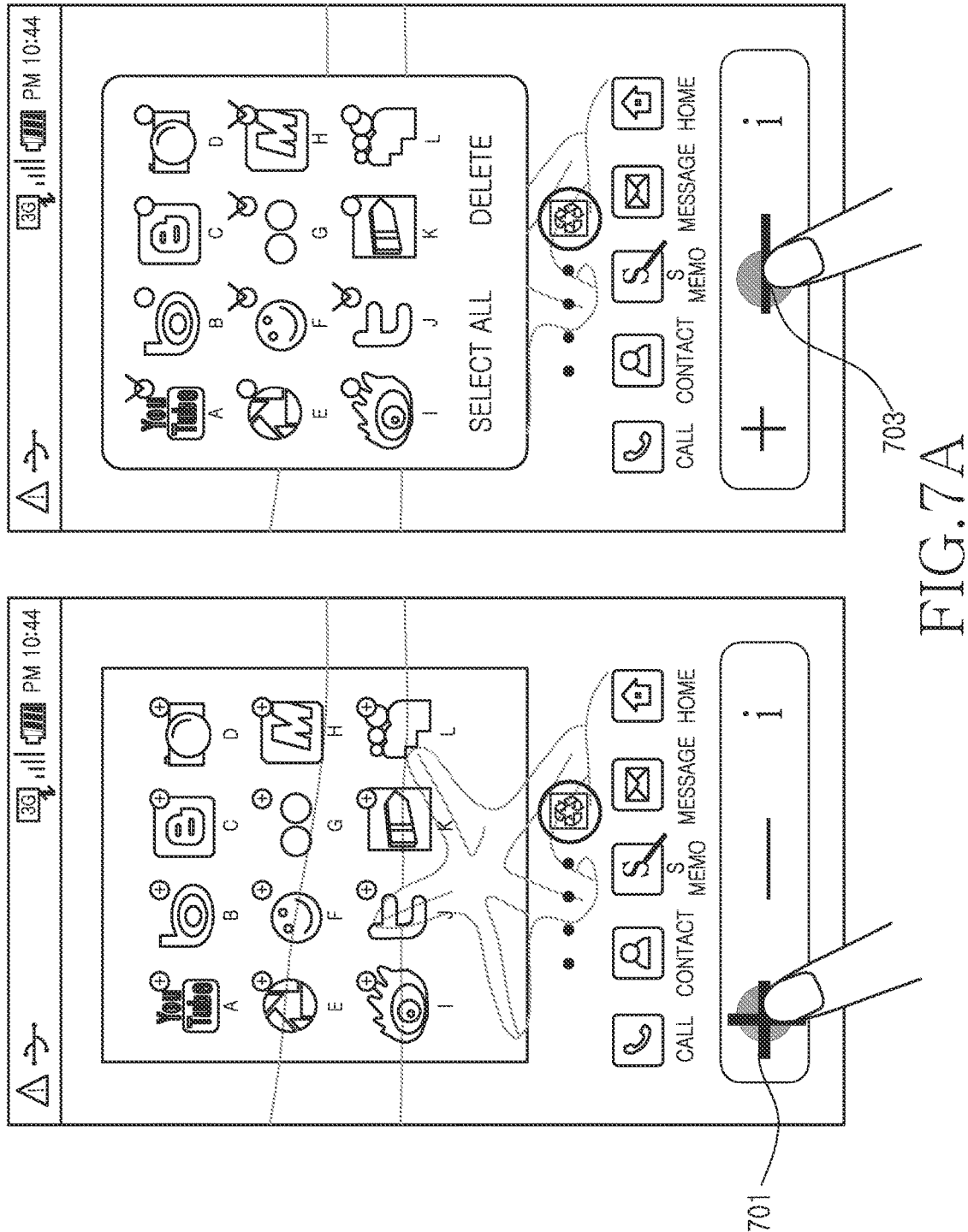
FIGS. 7A and 7B illustrate a screen for managing a deleted application in an electronic device according to an embodiment of the present disclosure.
Figure 7B:
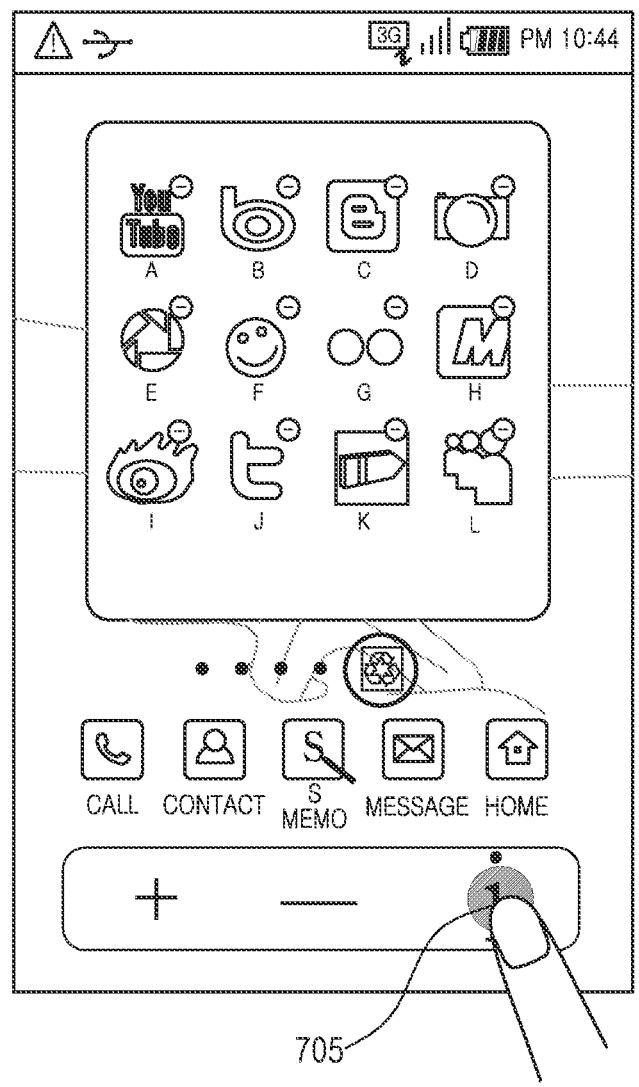

At operation 307, the electronic device 100 determines whether the deleted application is controlled. In this case, the electronic device 100 may control the deleted application to perform recovery, deletion, and information confirmation. For example, as illustrated in FIG. 7A and FIG. 7B, the electronic device 100 may perform a menu 701 for recovering the deleted application, a menu 703 for deleting the application, and a menu 705 for information confirmation.

Figure 9:
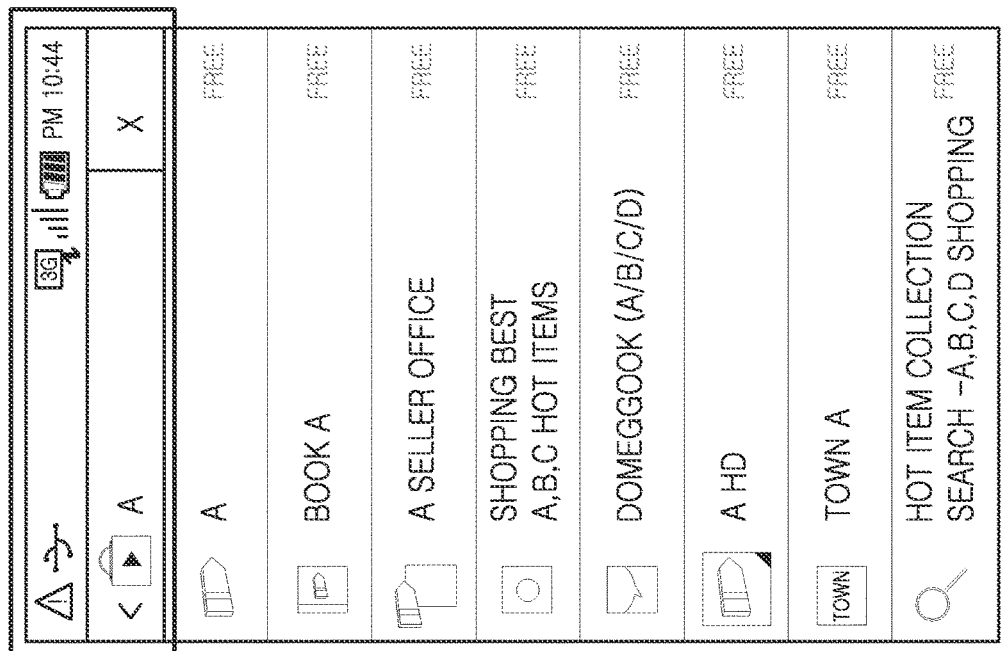
FIG. 9 illustrates an example of reinstalling a deleted application in an electronic device according to an embodiment of the present disclosure.
Figure 9:
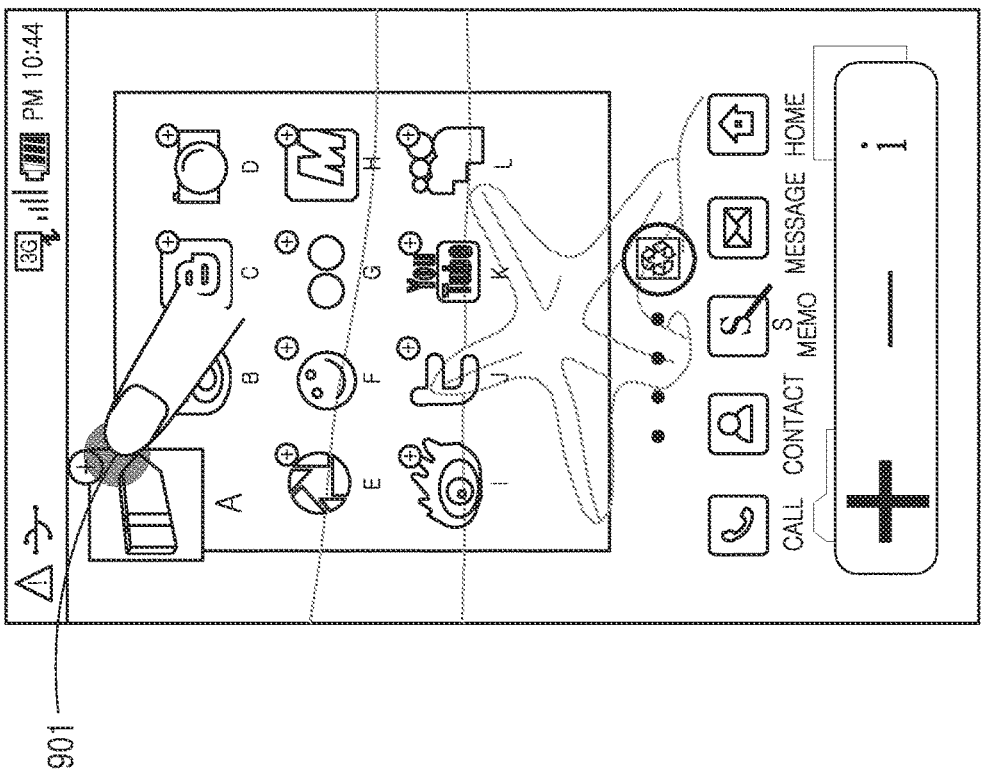

If it is detected that the menu for recovering the deleted application is selected, proceeding to operation 309, the electronic device 100 confirms history information of the selected application. At operation 311, the electronic device 100 confirms a download link included in the history information, and thereafter displays a download page of the selected application. Thereafter, the procedure of FIG. 3 ends. For example, as illustrated in FIG. 9, if it is detected that a first application is selected (see 901) after detecting that the menu for recovering the deleted application is selected, the electronic device 100 may display a page in which the first application is downloaded, and the first application may be downloaded again under a user control to install the application to the electronic device.

Figure 10A:
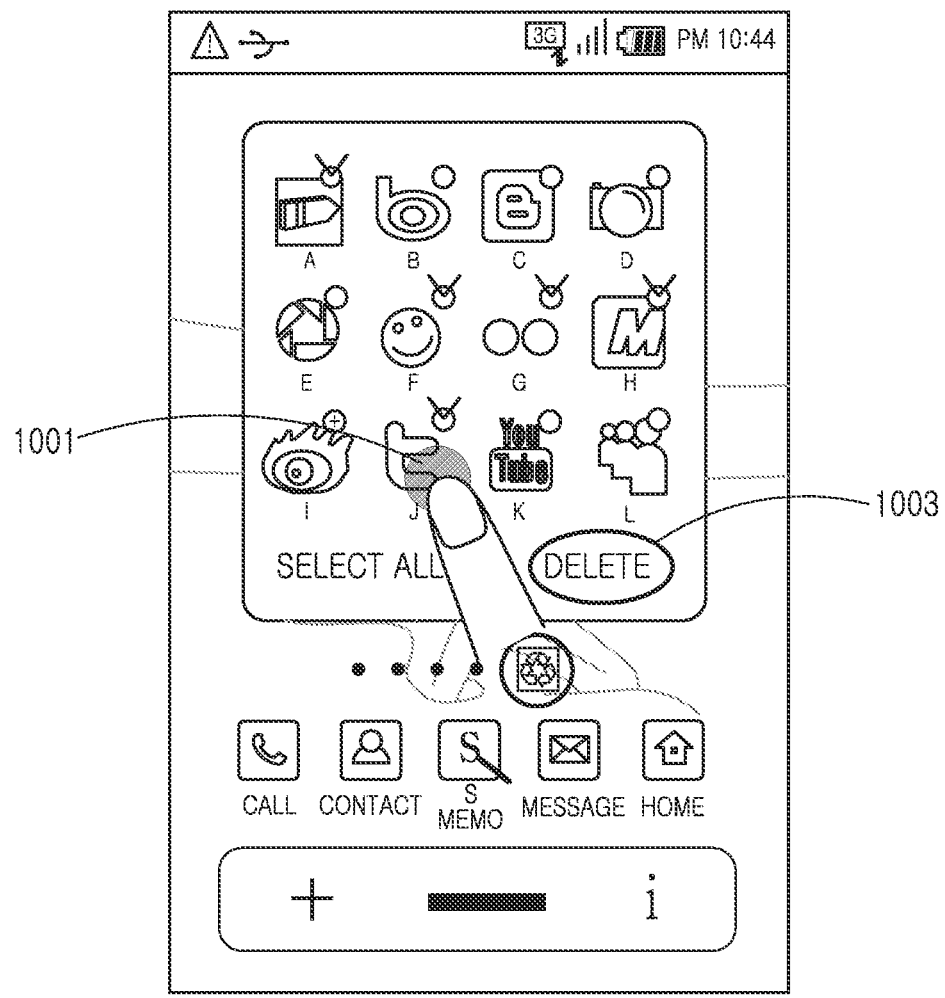
FIGS. 10A and 10B illustrate examples of deleting information of a deleted application in an electronic device according to an embodiment of the present disclosure.
Figure 10B:
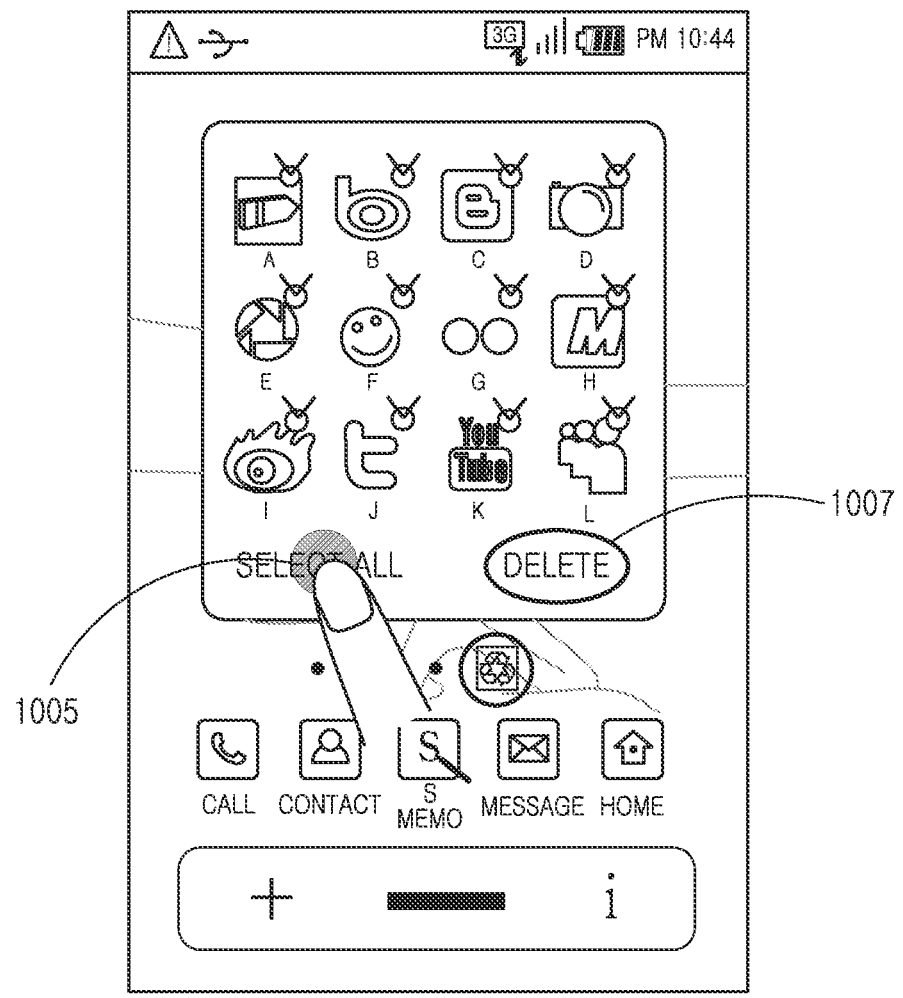

If it is detected that the menu for completely deleting the deleted application is selected, proceeding to operation 313, the electronic device 100 deletes history information of the selected application. Thereafter, the procedure of FIG. 3 ends. For example, as illustrated in FIG. 10A, if a plurality of applications are selected (see 1001) after detecting that the menu for completely deleting the deleted application is selected, and if it is detected that a menu for deleting the selected applications is selected (see 1003), then the electronic device 100 may delete entire history information of the selected applications among the deleted applications. For another example, as illustrated in FIG. 10B, if it is detected that a menu for selecting all applications is selected (see 1005) after detecting that the menu for completely deleting the deleted application is selected, and if it is detected that the menu for deleting the selected applications is selected (see 1007), then the electronic device 100 may delete entire history information of all deleted applications.

In addition, the electronic device may measure a time from a point at which each of the deleted applications is deleted, and if the measured time exceeds a threshold time, may automatically delete the application.

Figure 11:
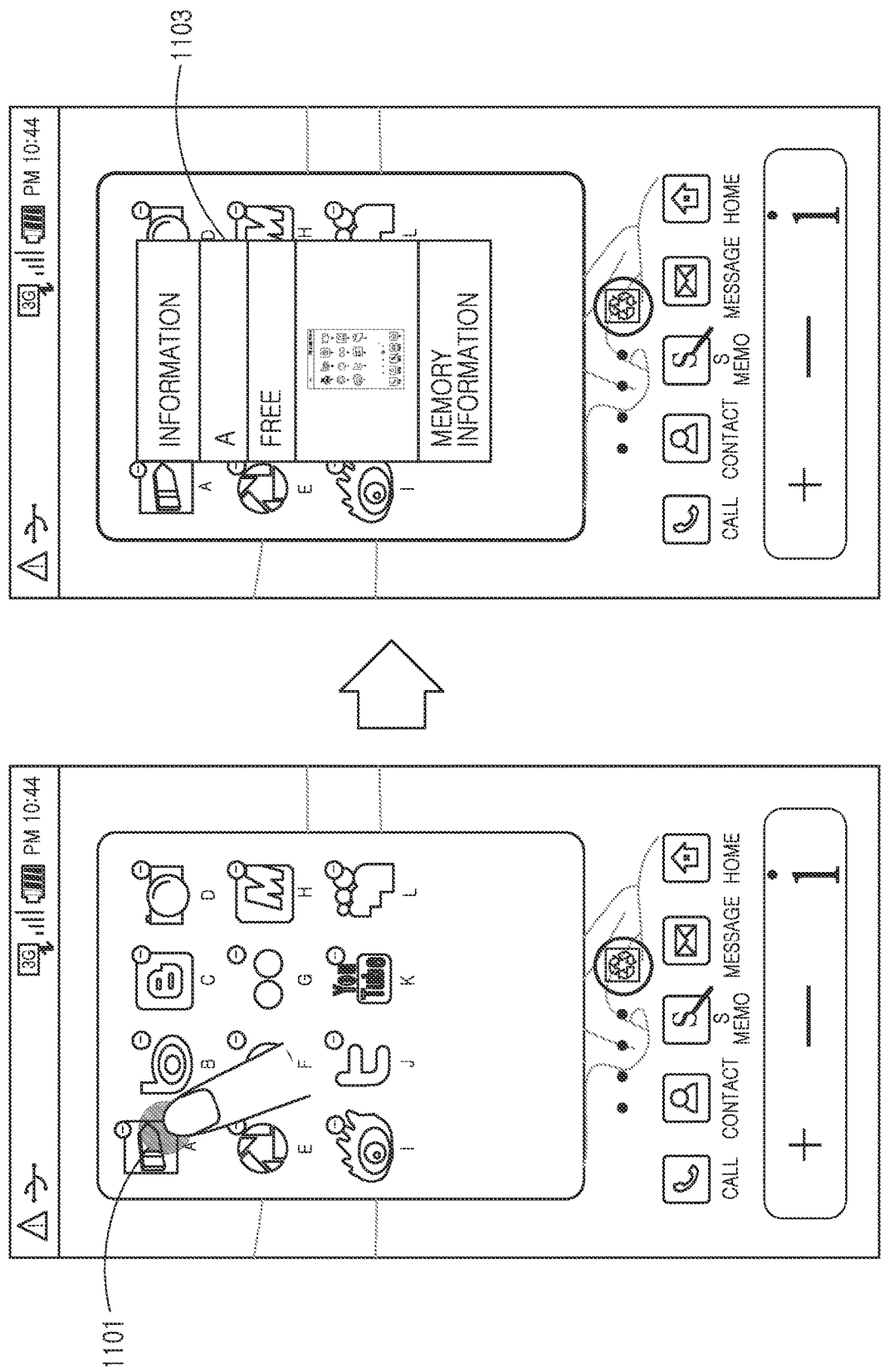
FIG. 11 illustrates an example of confirming information of a deleted application in an electronic device according to an embodiment of the present disclosure.

If it is detected that a menu for confirming information of the deleted application is selected, proceeding to operation 315, the electronic device 100 displays history information of the selected application. Thereafter, the procedure of FIG. 3 ends. For example, as illustrated in FIG. 11, if it is detected that a first application 1101 is selected (see 1101) after detecting that the menu for confirming the information of the deleted application is selected, the electronic device 1101 may display application information 1103 of the first application 1101.

Figure 8:
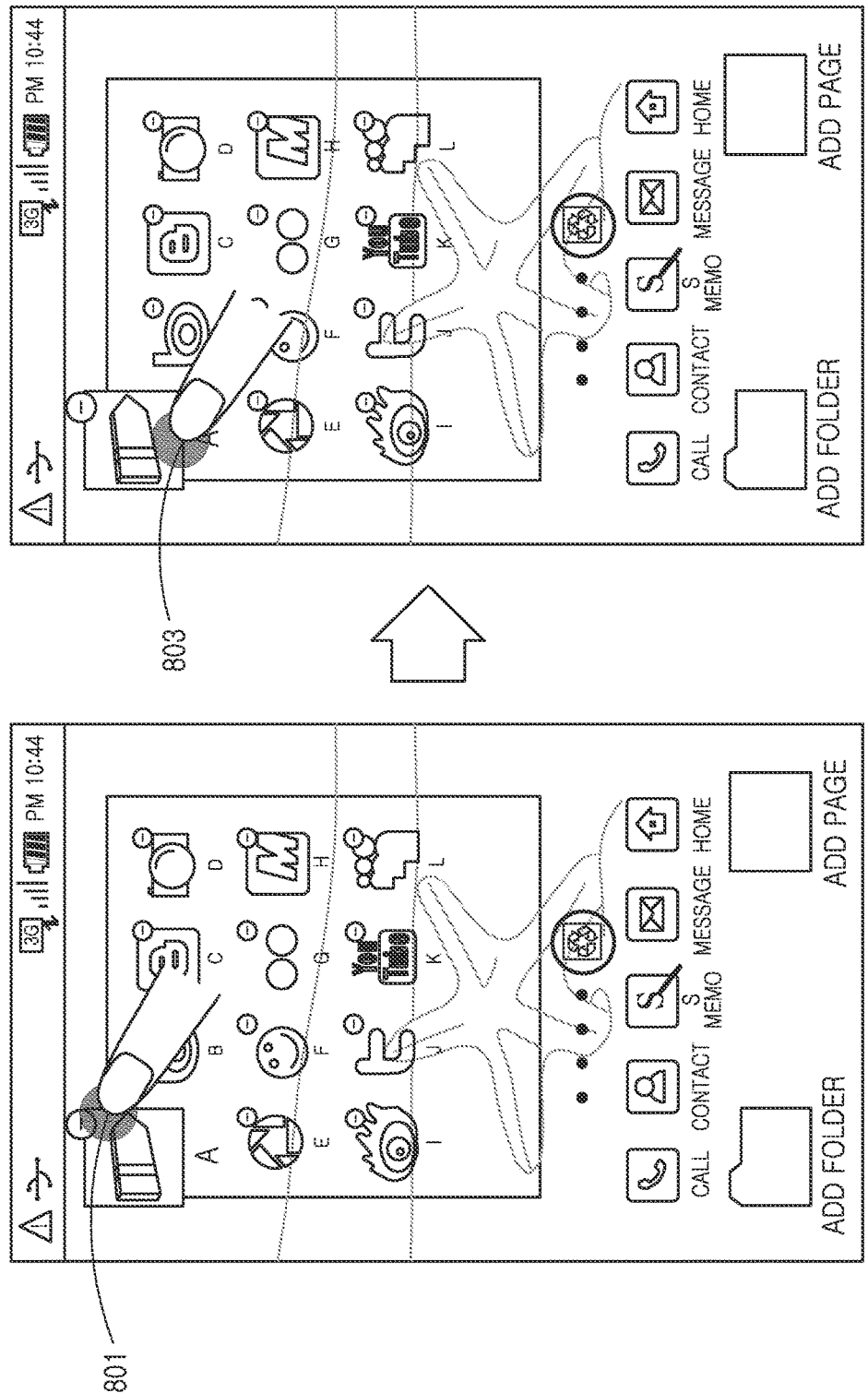
FIG. 8 illustrates an example of deleting information of a deleted application or reinstalling the deleted application in an electronic device according to an embodiment of the present disclosure.

The electronic device 100 of the present disclosure may recover and delete the deleted icon by dividing a touch range, instead of additionally providing a recovery menu and a deletion menu. For example, as illustrated in FIG. 8, upon sensing a touch 801 on a right-upper portion of an icon of a deleted application, the electronic device 100 may delete history information of the application. Upon sensing a touch 803 on a center portion of the icon of the deleted application, the electronic device 100 may recover the application.

Various embodiments and all of the functional operations of the present disclosure described in this specification may be implemented in computer software, firmware, or hardware, including the structures disclosed in this specification and their structural equivalents, or in combinations of one or more of them. Further, the various embodiments of the present disclosure described in this specification may be executed by one or more computer program products, i.e., an electronic device, a data processing device, etc., or may be implemented in one or more modules of computer program instructions encoded on a non-transitory computer readable medium for controlling an operation of these devices.

The non-transitory computer readable medium may be a machine-readable storage medium, a machine-readable storage substrate, a memory device, a composition of matter effecting a machine-readable propagated stream, or a combination of one or more of them. The term "data processing device" includes, for example, a programmable processor, a computer, or multiple processors or all apparatus, devices, and machines for processing data, including the computer. The apparatus may include, in addition to hardware, code that generates an execution environment for the computer program, e.g., code that constitutes processor firmware, a protocol stack, a database management system, an operating system, or a combination of one or more of them.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method in an electronic device, the method comprising:
   deleting an application;
   storing an icon display location at which an icon of the deleted application is arranged on a touch screen;
   detecting entering of an icon edit mode;
   determining whether there is a deleted application, if the icon edit mode is entered;

displaying icons of an installed application and the icon of the deleted application at the icon display location, if the deleted application exists; and recovering the deleted application by reinstalling the deleted application at the icon display location, if recovering the deleted application, wherein the icon of the deleted application is displayed visually distinguished from the icons of the installed application.

2. The method of claim 1, further comprising:
detecting a recovery event for the icon of the deleted application; and
upon the detection of the recovery event, displaying a download page of the deleted application by accessing a download link of the deleted application.

3. The method of claim 1, further comprising:
detecting a deletion event for the icon of the deleted application; and
upon the detection of the deletion event, deleting an icon of the deleted application and information related to the deleted application.

4. The method of claim 1, further comprising:
detecting an information confirmation event for the icon of the deleted application; and
upon the detection of the information confirmation event, displaying information of the deleted application,
wherein the information of the deleted application includes at least one of name information, icon image information, download link information, capacity information, and deletion location information.

5. The method of claim 4, wherein the information of the deleted application is stored based on at least one of a time at which the deleted application is installed in the electronic device and a time at which the application is deleted.

6. The method of claim 1, wherein the displaying of the icon of the deleted application comprises displaying the icon by visually distinguishing from an icon of an application not deleted from the electronic device, by controlling at least one of a size, color, and graphic effect of the icon of the deleted application.

7. The method of claim 1, further comprising:
generating an additional page other than a page in which icons of the application installed in the electronic device are displayed; and
displaying the icon of the deleted application in the additionally generated page.

8. The method of claim 1, further comprising displaying a menu for recovery, deletion, and information confirmation with respect to the icon of the deleted application, when in the icon edit mode.

9. The method of claim 1, further comprising detecting an occurrence of one of recovery, deletion, and information confirmation events on the deleted application on the basis of a touch location for the icon of the deleted application.

10. An electronic device comprising:
one or more processors;
a touch screen;
a memory; and
a program stored in the memory and configured to be executed by the one or more processors,
wherein the program includes an instruction for:
deleting an application,
storing an icon display location at which an icon of the deleted application is arranged on the touch screen,
detecting entering of an icon edit mode,
determining whether there is a deleted application, if the icon edit mode is entered,
displaying icons of an installed application and the icon of the deleted application at the icon display location, if the deleted application exists; and
recovering the deleted application by reinstalling the deleted application at the icon display location, if recovering the deleted application,
wherein the icon of the deleted application is displayed visually distinguished from the icons of the installed application.

11. The electronic device of claim 10, wherein the program further includes an instruction for detecting a recovery event for the icon of the deleted application, and upon the detection of the recovery event, for displaying a download page of the deleted application by accessing a download link of the deleted application.

12. The electronic device of claim 10, wherein the program further includes an instruction for detecting a deletion event for the icon of the deleted application, and upon the detection of the deletion event, for deleting an icon of the deleted application and information related to the deleted application.

13. The electronic device of claim 10,
wherein the program further includes an instruction for detecting an information confirmation event for the icon of the deleted application, and upon the detection of the information confirmation event, for displaying information of the deleted application, and
wherein the information of the deleted application includes at least one of name information, icon image information, download link information, capacity information, and deletion location information.

14. The electronic device of claim 13, wherein the information of the deleted application is stored based on at least one of a time at which the deleted application is installed in the electronic device and a time at which the application is deleted.

15. The electronic device of claim 10, wherein the program includes an instruction for displaying the icon by visually distinguishing from an icon of an application not deleted from the electronic device, by controlling at least one of a size, color, and graphic effect of the icon of the deleted application.

16. The electronic device of claim 10, wherein the program includes an instruction for generating an additional page other than a page in which icons of the application installed in the electronic device are displayed, and for displaying the icon of the deleted application in the additionally generated page.

17. The electronic device of claim 10, wherein the program further includes an instruction for displaying a menu for recovering, deleting, and information confirmation with respect to the icon of the deleted application, when in the icon edit mode.

18. The electronic device of claim 10, wherein the program further includes an instruction for detecting an occurrence of any one of recovery, deletion, and information confirmation events on the deleted application on the basis of a touch location for the icon of the deleted application.

* * * * *